US008510794B1

(12) United States Patent
Kaushik et al.

(10) Patent No.: US 8,510,794 B1
(45) Date of Patent: Aug. 13, 2013

(54) METHODS AND APPARATUS FOR A UNIFIED IDENTITY MANAGEMENT INTERFACE ACROSS INTERNAL AND SHARED COMPUTING APPLICATIONS

(71) Applicant: Identropy, Inc., New York, NY (US)

(72) Inventors: Nishant Kaushik, Jersey City, NJ (US);
Francisco Villavicencio, Tenafly, NJ (US); Ashraf Motiwala, Valley Stream, NY (US); Christopher Hydak, Austin, TX (US)

(73) Assignee: Identropy, Inc., New York, NY (US)

( * ) Notice: Subject to any disclaimer, the term of this patent is extended or adjusted under 35 U.S.C. 154(b) by 0 days.

(21) Appl. No.: 13/656,340

(22) Filed: Oct. 19, 2012

Related U.S. Application Data

(60) Provisional application No. 61/671,776, filed on Jul. 15, 2012.

(51) Int. Cl.
*G06F 21/00* (2013.01)
(52) U.S. Cl.
USPC ............... 726/1; 726/2; 726/6; 726/8; 726/11
(58) Field of Classification Search
USPC ........................................... 726/1, 2, 6, 8, 11
See application file for complete search history.

(56) References Cited

U.S. PATENT DOCUMENTS

| 6,028,994 A * | 2/2000 | Peng et al. ..................... 703/15 |
| 8,079,118 B2 * | 12/2011 | Gelvin et al. ..................... 26/26 |
| 2002/0099661 A1 * | 7/2002 | Kii et al. ........................ 705/51 |
| 2011/0075678 A1 * | 3/2011 | Chen et al. .................... 370/412 |
| 2011/0192844 A1 * | 8/2011 | Erdmann et al. ............. 220/86.2 |

FOREIGN PATENT DOCUMENTS

JP 2010049551 A * 3/2010

OTHER PUBLICATIONS

IBM Technical Disclosure, "Partial Containment Structure for Integration of Distributed Computing Environment and Local Registries", vol. 38, No. 9, Sep. 1995, pp. 1-4.*

* cited by examiner

*Primary Examiner* — Lisa Lewis
(74) *Attorney, Agent, or Firm* — Stephen A. Mason; Meyertons, Hood, Kivlin, Kowert & Goetzel, P.C.

(57) ABSTRACT

Various embodiments of methods and apparatus for a unified management interface across internal and shared computing applications are disclosed. In some embodiments, one or more processors perform, responsive to receiving a plurality of access management requests at an identity management interface, transmitting an access management instruction to a customer internal application via an on-premise proxy, and transmitting another access management instruction to a shared computing system application via a multi-customer gateway on the shared computing system.

21 Claims, 14 Drawing Sheets

METHODS AND APPARATUS FOR A UNIFIED IDENTITY MANAGEMENT INTERFACE ACROSS INTERNAL AND SHARED COMPUTING APPLICATIONS

CLAIM OF PRIORITY TO PROVISIONAL APPLICATION

This application claims benefit of priority of U.S. Provisional Application Ser. No. 61/671,776 entitled "Methods and Apparatus for Identity Management" filed Jul. 15, 2012, the content of which is incorporated by reference herein in its entirety.

DESCRIPTION OF THE RELATED ART

As the reach and accessibility of computer networks such as the Internet and corporate networks increase, the amount of information accessible via such networks grows exponentially, creating a concomitant tendency toward increasing ability of systems on those networks to perform a richer and more varied array of functions. For example, as commercial enterprises increasingly embrace a digital workplace, a suite of computer-based systems is being deployed for the management of functions ranging from the delivery of information to the execution of transactions and operation of machinery.

The increase in the number of functions performed by computing machines operating over networks increases the need to provide advanced tools for managing access to those computing machines and the networks that connect them. Identity management is the management of individual identities, their authentication, authorization, and privileges/permissions within or across system and enterprise boundaries with the goal of increasing security and productivity while decreasing cost, downtime, and repetitive tasks.

The problems of identity management are compounded by the scale of enterprises, the complexity and variety of resources provided, and the heterogeneity of resource types and environments. Tools in the identity management space have yet to fully address the problems created by an increasingly global, increasingly networked work environment with resources deployed on varying networks in varying locations and supporting diverse casts of users.

SUMMARY

Various embodiments of methods and apparatus for a unified management interface across internal and shared computing applications are disclosed. In some embodiments, one or more processors perform, responsive to receiving a plurality of access management requests at an identity management interface, transmitting an access management instruction to a customer internal application via an on-premise proxy, and transmitting another access management instruction to a shared computing system application via a multi-customer gateway on the shared computing system.

Figure 1:
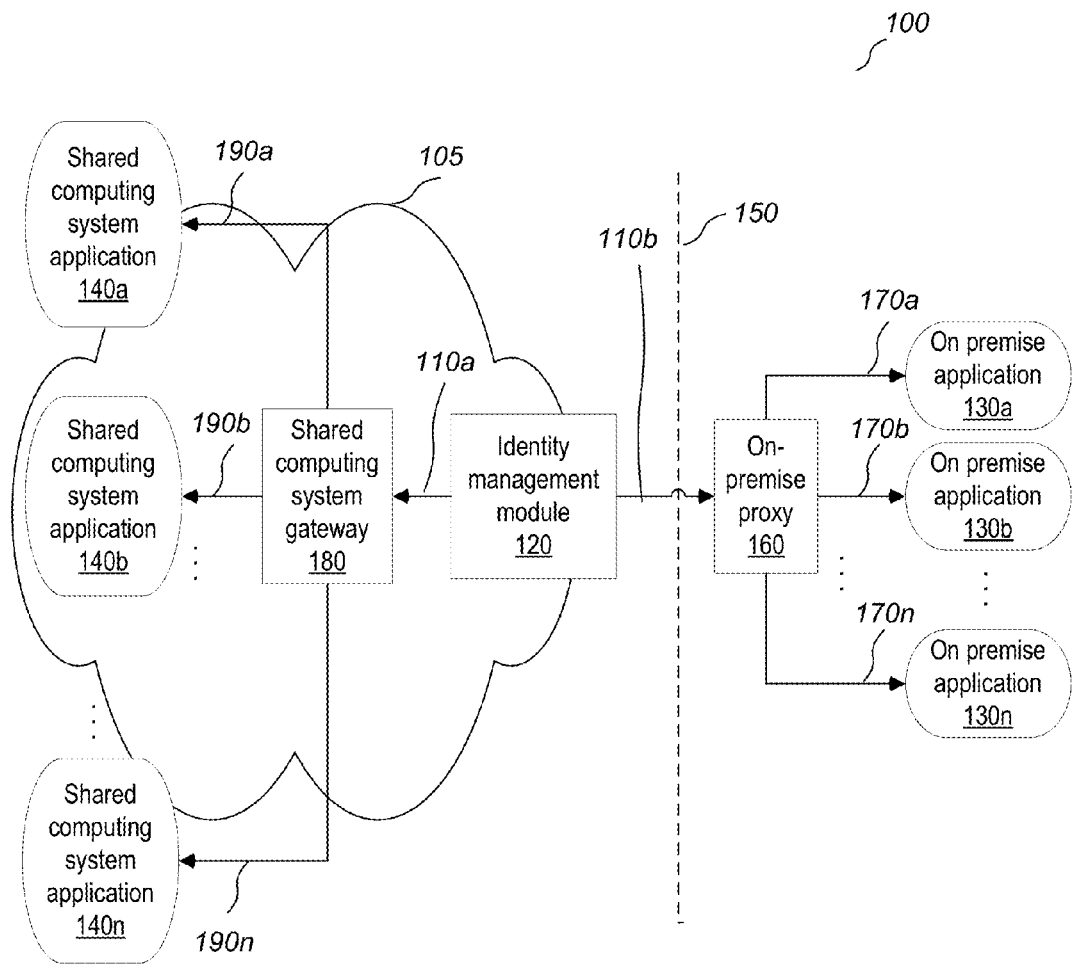
FIG. 1 illustrates a system that may implement identity management, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Some embodiments address the problem of managing identities and corresponding access privileges across multiple platforms that include both external (for example, cloud-based) resources and internal (for example, on-premise) resources.

Some embodiments provide a unified management interface across internal and shared computing applications, thereby allowing a user to create and manage accounts through a single interface for both the on-premise applications and the cloud-based applications used by his or her company. In some embodiments, one or more processors perform, responsive to receiving a plurality or set of access management requests at an identity management interface, transmitting an access management instruction to a customer internal application via an on-premise proxy, and transmitting another access management instruction to a shared computing system application via a multi-customer gateway on the shared computing system.

Introduction to Computing Terminology

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While some processes or operations described herein are described as being performed by a particular module or modules, one of skill in the art will readily discern in light of having read the present disclosure that such operations or process may be performed by other modules or other computing systems without departing from the scope and intent of the present disclosure. Likewise, while some process are presented as a series of operations and are explained in a particular order, one of skill in the art will readily discern in light of having read the present disclosure that such operations or processes may be performed in an alternative order or combination without departing from the scope and intent of the present disclosure. Embodiments will combine, omit, and substitute modules and the operations that they perform or execute without departing from the scope and intent of the present disclosure. In the discussion contained herein, embodiments are described as performing operations or procedures, which may be taken to mean both performing an operation or procedure directly or supporting that operation or procedure through the processing or preparation of data for that operation or procedure.

Introduction to Integrated Interface for a Unified Management Interface Across Internal and Shared Computing Applications Various embodiments of methods and apparatus for a unified management interface across internal and shared computing applications are disclosed. In some embodiments, one or more processors perform, responsive to receiving a plurality of access management requests at an identity management interface, transmitting an access management instruction to a customer internal application via an on-premise proxy, and transmitting another access management instruction to a shared computing system application via a multi-customer gateway on the shared computing system.

In some embodiments, the transmitting the access management instruction to the customer internal application further includes transmitting the access management instruction from an identity management module to the on-premise proxy. The transmitting the another access management instruction to the shared computing system application further includes transmitting the access management instruction from the identity management module to the multi-customer gateway. The identity management module is located external to a firewall. The on-premise proxy and the customer internal application are located internal to the firewall. The shared computing system application and the multi-customer gateway on the shared computing system are located external to the firewall.

In some embodiments, the shared computing system and the customer internal application are monitored for fulfillment of the access management instruction and the another access management instruction.

In some embodiments, the shared computing system and the customer internal application are monitored for fulfillment of the access management instruction and the another access management instruction. A present problem is diagnosed based at least in part on a failure of fulfillment of the access management instruction or the another access management instruction. A correction to the problem is suggested.

In some embodiments, the shared computing system and the customer internal application are monitored for fulfillment of the access management instruction and the another access management instruction as well as patterns of access management instructions and fulfillments. A present problem is diagnosed based on a pattern of failures of access management instruction and fulfillments. A correction to the problem is suggested.

In some embodiments, the shared computing system and the customer internal application are monitored for fulfillment of the access management instruction and the another access management instruction as well as patterns of access management instructions and fulfillments. A future problem is predicted based at least in part on a pattern of failures of access management instruction and fulfillments. A correction to the problem is suggested. In some embodiments, the diagnosing, predicting or suggesting further includes diagnosing, predicting or suggesting based at least in part on a neural networks learning based prediction engine accessing runtime-data to make predictions based on changes in usage patterns.

Some embodiments may include a means for unified management interface across internal and shared computing applications. For example, an identity management module may, responsive to receiving a plurality of access management requests at an identity management interface, perform transmitting an access management instruction to a customer internal application via an on-premise proxy, and transmitting another access management instruction to a shared computing system application via a multi-customer gateway on the shared computing system, as described herein.

The identity management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform, responsive to receiving a plurality of access management requests at an identity management interface, transmitting an access management instruction to a customer internal application via an on-premise proxy, and transmitting another access management instruction to a shared computing system application via a multi-customer gateway on the shared computing system, as described herein. Other embodiments of the identity management module may be at least partially implemented by hardware circuitry and/or firmware stored, for example, in a non-volatile memory.

Introduction to Performing Adaptive User Interface Functions in Identity Management Various embodiments of methods and apparatus for performing adaptive user interface functions in identity management are disclosed. A user interface to a user of an identity management module is presented. In some embodiments the user interface is a single user interface including options for transmitting an access management instruction to a customer internal application via an on-premise proxy, and transmitting another access management instruction to a shared computing system application via a multi-customer gateway on the shared computing system. In some embodiments, the user interface is adaptively adjusted to highlight suggested access entitlement operations based at least in part upon expected access entitlements derived from a learning based prediction engine.

In some embodiments, the adaptively adjusting the user interface to highlight suggested access entitlement operations further includes adaptively adjusting the user interface based at least in part upon user identity and past behavior. In some embodiments, the adaptively adjusting the user interface to highlight suggested access entitlement operations further comprises adaptively adjusting the user interface such that, when the user clicks on suggestions, in the access request interface, the recommendation engine determines, based on the end user's identity data, as well as behavioral patterns over the last interactions, who are the most likely users for which the end user (the requester) may want to request access.

In some embodiments, the adaptively adjusting the user interface to highlight suggested access entitlement operations further includes the presenting the single user interface including the options for transmitting the access management instruction to the customer internal application via the on-premise proxy, and the transmitting the another access management instruction to the shared computing system application via the multi-customer gateway on the shared computing system further includes presenting the user interface in a platform-agnostic fashion such that user controls do not inform a user of the single user interface as to whether a particular option invokes transmission to a shared computing system or a customer internal application.

In some embodiments, the adaptively adjusting the user interface to highlight suggested access entitlement operations based at least in part upon expected access entitlements derived from a learning based prediction engine further includes adaptively adjusting the user interface to highlight suggested access entitlement operations based on a neural networks learning based prediction engine accessing runtime-data to make predictions based on changes in usage patterns.

In some embodiments, the adaptively adjusting the user interface to highlight suggested access entitlement operations based at least in part upon expected access entitlements derived from a learning based prediction engine further includes presenting a next selected operation based on patterns in an identity management access database discerned by a learning-based prediction engine. In some embodiments, the adaptively adjusting the user interface to highlight suggested access entitlement operations based at least in part upon expected access entitlements derived from a learning based prediction engine further includes presenting a next selected operation based on auditing an identity management access database using a learning-based prediction engine to assess priority of operations that can be performed by a user of the user interface.

Some embodiments may include a means for adaptive user interface functions in identity management. For example, an identity management module may present a user interface, as described herein. In some embodiments the user interface presented by the identity management module is a single user interface including options for transmitting an access management instruction to a customer internal application via an on-premise proxy, and transmitting another access management instruction to a shared computing system application via a multi-customer gateway on the shared computing system. In some embodiments, the user interface presented by the identity management module is adaptively adjusted to highlight suggested access entitlement operations based at least in part upon expected access entitlements derived from a learning based prediction engine.

The non-uniform identity management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting a user interface, as described herein. In some embodiments the user interface is a single user interface including options for transmitting an access management instruction to a customer internal application via an on-premise proxy, and transmitting another access management instruction to a shared computing system application via a multi-customer gateway on the shared computing system. In some embodiments, the user interface is adaptively adjusted to highlight suggested access entitlement operations based at least in part upon expected access entitlements derived from a learning based prediction engine. Other embodiments of the identity management module may be at least partially implemented by hardware circuitry and/or firmware stored, for example, in a non-volatile memory.

Introduction to Suggesting Access Entitlement Operations Based at Least in Part Upon the Expected Access Entitlements Various embodiments of methods and apparatus for suggesting access entitlement operations based at least in part upon the expected access entitlements are disclosed. In some embodiments, an identity management access database is exposed to a learning based prediction engine. Expected access entitlements of an identity are predicted in response to discovery of patterns in the identity management access database. Access entitlement operations are suggested based at least in part upon the expected access entitlements.

In some embodiments, the suggesting access entitlement operations based upon the expected access entitlements further comprises modifying a graphical user interface to highlight suggested access entitlement operations based at least in part upon the expected access entitlements. In some embodiments, the suggesting access entitlement operations based upon the expected access entitlements further includes suggesting modifications to an existing role based at least in part upon the expected access entitlements. In some embodiments, the suggesting access entitlement operations based upon the expected access entitlements further includes suggesting modifications to an existing identity based at least in part upon the expected access entitlements.

In some embodiments, the suggesting access entitlement operations based upon the expected access entitlements further includes auditing existing identities to detect anomalies based at least in part upon the expected access entitlements. In some embodiments, the suggesting access entitlement operations based upon the expected access entitlements further comprises suggesting access entitlement operations based upon changes to usage patterns in the access entitlements of existing users. In some embodiments, the exposing the identity management access database to a learning based prediction engine further comprises facilitating prediction of access entitlements based at least in part on runtime changes by exposing the identity management access database to a runtime-learning neural networks based prediction engine.

Some embodiments may include a means for suggesting access entitlement operations based at least in part upon the expected access entitlements. For example, an identity management module may expose an identity management access database to a learning based prediction engine, expected access entitlements of an identity are predicted in response to discovery of patterns in the identity management access database and access entitlement operations are suggested based at least in part upon the expected access entitlements, as described herein.

The identity management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform exposing an identity management access database to a learning based prediction engine, predicting expected access entitlements of an identity in response to discovery of patterns in the identity management access database and suggesting access entitlement operations are suggested based at least in part upon the expected access entitlements, as described herein. Other embodiments of the identity management module may be at least partially implemented by hardware circuitry and/or firmware stored, for example, in a non-volatile memory.

Example Implementations

FIG. 1 illustrates a system that may implement identity management, according to some embodiments. Identity management is the management of user individual identities, their authentication, authorization, and privileges/permissions within or across system and enterprise boundaries with the goal of increasing security and productivity while decreasing cost, downtime, and repetitive tasks. A typical problem of identity management is creating the accounts on various systems for a new employee or adjusting the access privileges of those accounts as the role or roles of the employee change.

In one embodiment, an identity management ecosystem 100 includes (customer internal) on-premise applications 130a-130n and shared computing system (cloud) applications 140a-140n that are managed that are managed by an identity management module 120. Note that, as used herein, 'n' represents a flexibly variable quantity of elements, and the presence of differently numbered devices bearing the same reference letter (e.g., 102a and 100a), does not necessarily indicate a correspondence or interaction between differently numbered devices bearing the same reference letter. Further, the recurrence of 'n' as an alphabetical designator does not indicate that multiple flexibly variable quantities of devices are equal. Nor does the designation of a single member of such a plurality as 'n' indicate that it necessarily corresponds to an 'nth' member of a different plurality, though they may correspond. This convention is employed in order to reduce confusion in the drawings. An example of a typical identity management problem might be the addition of a new doctor in a hospital. Such a doctor might need access to customer internal systems represented by on-premise applications 130a-130n.

Examples of such internal systems might be building security (e.g., the activation of an identification badge to open doors in the hospital), payroll and benefits, and shift scheduling. At the same time, the doctor might also require access to off-premise shared computing system (cloud) applications 140a-140n such as insurance billing systems, pharmacy prescribing systems, and centralized medical records. Identity management module 120 may support user management by a help/service desk, as in creation, deletion, modification of user identity data by a staffed desk to provide the hypothetical doctor with required access. Alternatively or additionally, identity management module 120 may support user self service, as in a user being able to modify one's own mutable or correctable data—e.g. postal address, telephone number, and more importantly and frequently, one's own credentials. Credentials are the, typically, secret piece of information that allows a user to identify himself or herself to the identity management system.

Identity management module 120 receives a plurality of access management requests at an identity management interface. These access management requests include creation, deletion, modification of user identity data and granting or removal of privileges to various systems. In some embodiments, some access management requests are role based, which is to say that the access privileges associated with a particular user are based on a role associated with the user.

For example, identity management module 120 may receive an access management request at an identity management interface to create a new user who is identified in the 'doctor' role, with access privileges, such as prescribing, medical records, scheduling, billing, physical building access, and benefits assigned to that role as described above. Alternatively, identity management module 120 may receive an access management request at an identity management interface to create a new user who is identified in the 'nurse' role, with access privileges, such as medical records, scheduling, physical building access, and benefits assigned to the role, but prescribing and billing withheld. Other examples of access management requests supported by embodiments include changing the role or roles of a user, making individual modifications outside those typically assigned with to a role, or updating a role to apply updates to all users having that role.

In some embodiments, some access management requests facilitate role-based delegated user administration, which involves, as an example, a supervisor of an employee being able to modify certain attributes of an employee's user data. In some embodiments, delegation allows for scaling of an identity management solution in that local administrators with access to identity management module 120 or supervisors with access to identity management module 120 are able to perform permissible modifications without requiring authorization from a global administrator. Roles-based aspects allow for the supervisor to be a role in such embodiments, as opposed to a specific person. Role-based access mechanisms also allow for implementation of privacy controls around user attribute data. In some embodiments, identity management module 120 may handle through access management requests provisioning resources, as in the assignment of a desk or a phone to a new employee in an office.

In response to receiving the plurality of access management requests at the identity management interface, identity management module 120 transmits access management instructions across customer firewall 150 using connector 110b and connectors 170a-170n to customer internal applications 130a-130n via an on-premise proxy 160. Identity management module 120 transmits other access management instructions to a shared computing system 105 (e.g., a cloud) and shared computing system applications 140a-140n via a multi-customer shared computing system gateway 180 on the shared computing system 105 using connectors 190a-190n and connector 110a.

As described below with reference to FIGS. 11-13, a user interface is presented to a user of identity management module 120. In some embodiments the user interface is a single user interface including options for transmitting access management instructions to (customer internal) on-premise applications 130a-130n via on-premise proxy 160, and transmitting other access management instructions to a shared computing system (cloud) applications 140a-140n via multi-customer shared computing system gateway 180 on the shared computing system 105. In some embodiments, the user interface is adaptively adjusted to highlight suggested access entitlement operations based at least in part upon expected access entitlements derived from a learning based prediction engine.

In some embodiments, an identity management access database is exposed to a learning based prediction engine by identity management module 120. Expected access entitlements of an identity are predicted by identity management module 120 in response to discovery of patterns in the identity management access database. Access entitlement operations are suggested by identity management module 120 based at least in part upon the expected access entitlements.

In some embodiments, identity management module 120 transmits the access management instructions to the customer internal applications (on premise applications 130a-130n) by transmitting the access management instructions from the identity management module 120 to the on premise proxy 160, and transmits other access management instructions to the shared computing system applications 140a-140n by transmitting the access management instructions from the identity management module 120 to the multi-customer shared computing system gateway 180 (shared computing system gateway 180). In some embodiments, a firewall 150 separates identity management module 120 and shared computing system applications 140a-140n from on-premise applications 130a-130n such that the identity management module 120 is located external to the firewall 150. The on-premise proxy 160 and the customer internal applications (on premise applications 130a-130n) are located internal to the firewall 150. The shared computing system applications 140a-140n and the multi-customer gateway (shared computing system gateway 180) on the shared computing system (cloud 105) are located external to the firewall 150.

In some embodiments, identity management module 120 monitors the shared computing system (cloud 105 or one or more of shared computing system applications 140a-140n) and the customer internal application (on premise applications 130a-130n) for fulfillment of access management instructions. In some embodiments, identity management module 120 diagnoses a present problem based at least in part on a failure of fulfillment of the access management instructions and suggests a correction to the problem. In some embodiments, identity management module 120 monitors the shared computing system (cloud 105 or one or more of shared computing system applications 140a-140n) and the customer internal application (on premise applications 130a-130n) for fulfillment of access management instructions as well as patterns of access management instructions and fulfillments. In some embodiments, identity management module 120 diagnoses a present problem based at least in part on a pattern of failures of access management instruction and fulfillments and suggests a correction to the problem.

In some embodiments, identity management module 120 monitors the shared computing system (cloud 105 or one or more of shared computing system applications 140a-140n) and the customer internal application (on premise applications 130a-130n) for fulfillment of access management instructions as well as patterns of access management instructions and fulfillments. In some embodiments, identity management module 120 predicts a future problem based at least in part on a pattern of failures of access management instruction and fulfillments and suggests a correction to the problem. In some embodiments, the predicting includes predicting based at least in part on a neural networks learning based prediction engine accessing runtime-data to make predictions based on changes in usage patterns.

Figure 2:
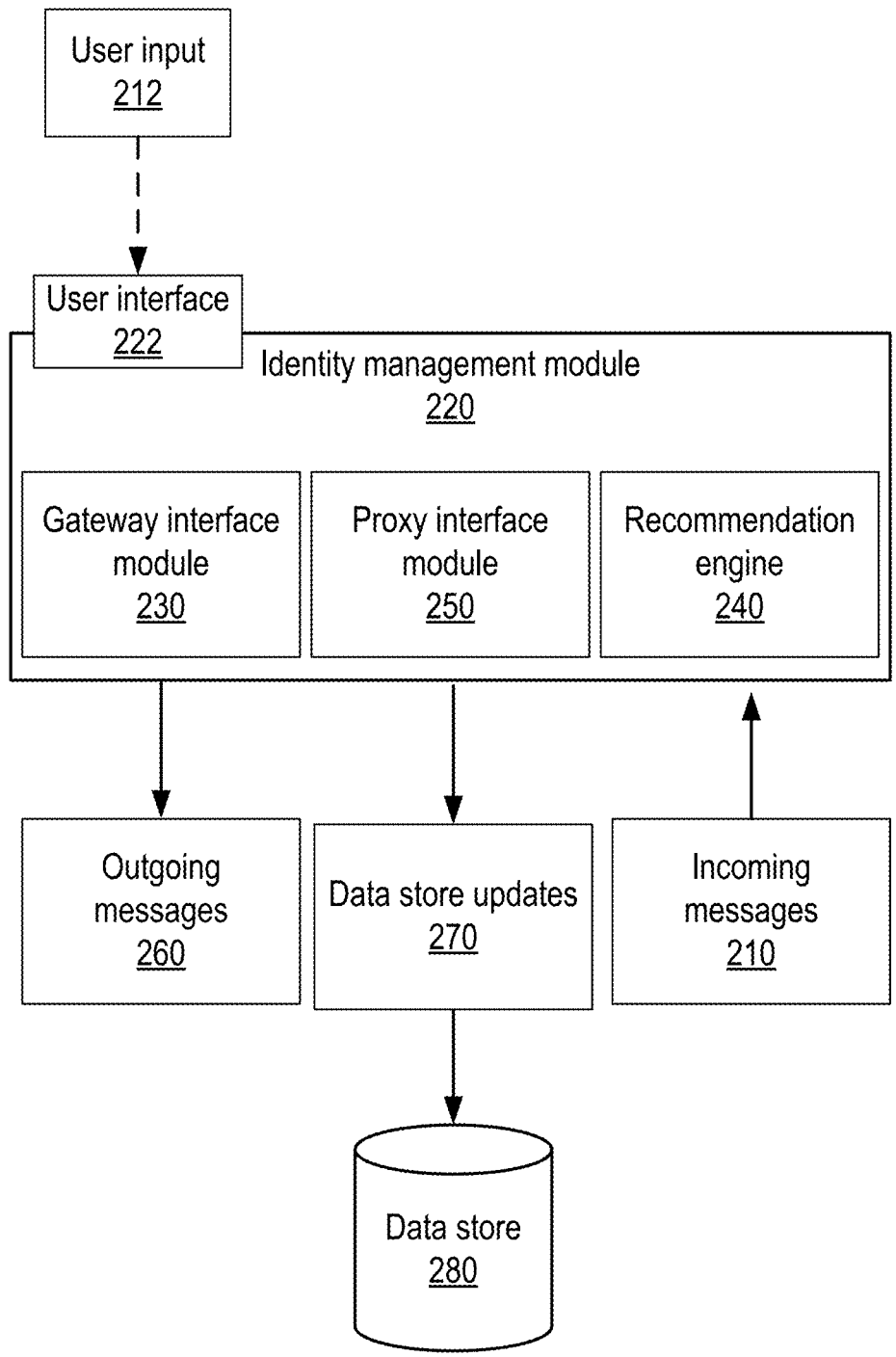
FIG. 2 depicts a module that may implement identity management, according to some embodiments.

FIG. 2 depicts a module that may implement identity management, according to some embodiments, which may implement one or more of the identity management techniques and tools illustrated in FIGS. 3-13 or variously described herein. Identity management module 220 may, for example, implement one or more of a tool for unified management interface across internal and shared computing applications, an adaptive user interface, or a tool for access entitlement operations based at least in part upon the expected access entitlements. FIG. 14 illustrates an example computer system on which embodiments of identity management module 220 may be implemented.

Identity management module 220 receives as input one or more incoming messages 210. Incoming messages may be received from user shared computing system applications across connectors by means of a shared computing system gateway or from on-premise applications across connectors by means of an on-site proxy, as described above with respect to FIG. 1. An example incoming message is a message indicating fulfillment of an access management instruction.

Identity management module 220 may receive user input 212 including access management requests. Identity management module 220 then transmits an access management instruction as an outgoing message 260 to a customer internal application via an on-premise proxy, and transmits another access management instruction to a shared computing system application as an outgoing message 260 via a multi-customer gateway on the shared computing system, according to user input 212 received via user interface 222, which may execute on a diverse assortment of physical computing platforms that include devices ranging from mobile computing platforms (phones, tablets, laptop computers) to fixed computing platforms such as desktop computers and virtual sessions on shared computing systems. Identity management module 220 generates as output one or more data store updates 230. Data store updates 270 may, for example, be stored to a data store 280, such as an identity management access database stored on system memory, a disk drive, DVD, CD, etc. In response to user input 212 including access management requests received at user interface 222, a proxy interface module 230 performs transmitting an access management instruction to a customer internal application via an on-premise proxy, and a gateway interface module performs transmitting another access management instruction to a shared computing system application via a multi-customer gateway on the shared computing system.

User interface 222 presents a user interface to a user of an identity management module. Examples of such a user interface are illustrated below with respect to FIGS. 11-13. In some embodiments, the user interface is a single user interface including options for transmitting using proxy interface module 250 an access management instruction as an outgoing message 260 to a customer internal application via an on-premise proxy, and transmitting via gateway interface module 230 another access management instruction as an outgoing message 260 to a shared computing system application via a multi-customer gateway on the shared computing system. In some embodiments, user interface 222 is adaptively adjusted to highlight suggested access entitlement operations based at least in part upon expected access entitlements derived from a learning based prediction engine interacting with data store 280.

In some embodiments, an identity management access database, such as data store 280 is exposed to a learning based prediction engine, such as recommendation engine 240. Expected access entitlements of an identity or role are predicted by recommendation engine 240 in response to discovery of patterns in the identity management access database, such as data store 280. Access entitlement operations are suggested by recommendation engine 240 based at least in part upon the expected access entitlements.

In some embodiments, user interface 222 adaptively adjusts the user interface based at least in part upon user identity and past behavior. In some embodiments, user interface 222 adaptively adjusts the user interface such that, when the user clicks on suggestions, in the access request interface, the recommendation engine determines, based on the end user's identity data, as well as behavioral patterns over the last interactions, who are the most likely users for which the end user (the requester) may want to request access. In some embodiments, user interface 222 presents the single user interface including the options for transmitting the access management instruction to the customer internal application via the on-premise proxy, and the transmitting the another access management instruction to the shared computing system application via the multi-customer gateway on the shared computing system in a platform-agnostic fashion such that user controls do not alert or inform a user of the single user interface as to whether a particular option invokes transmission to a shared computing system or a customer internal application.

In some embodiments, user interface 222 adaptively adjusts the user interface to highlight suggested access entitlement operations based on a neural networks learning based prediction engine embodied by recommendation engine 240 accessing runtime-data from data store 280 to make predictions based on changes in usage patterns. In some embodiments, user interface 222 presents a next selected operation based on patterns in identity management access database discerned by a learning-based prediction engine. In some embodiments, user interface 222 presents a next selected operation based on auditing an identity management access database using a learning-based prediction engine to assess priority of operations that can be performed by a user of the user interface.

In some embodiments, user interface 222 performs modifying a graphical user interface to highlight suggested access entitlement operations based at least in part upon the expected access entitlements as received from recommendation engine 240. In some embodiments, recommendation engine 240 suggests modifications to an existing role based at least in part upon the expected access entitlements. In some embodiments, recommendation engine 240 suggests modifications to an existing identity based at least in part upon the expected access entitlements. In some embodiments, recommendation engine 240 audits existing identities to detect anomalies based at least in part upon the expected access entitlements. In some embodiments, recommendation engine 240 suggests access entitlement operations based upon changes to usage patterns in the access entitlements of existing users reflected in data store 280. In some embodiments, recommendation engine 240 predicts access entitlements based at least in part on runtime changes by exposing the identity management access database to a runtime-learning neural networks based prediction engine.

In some embodiments, proxy interface module 250 performs the transmitting the access management instruction as an outgoing message 260 to a customer internal application by transmitting the access management instruction from an identity management module to the on premise proxy. In some embodiments, gateway interface module 230 performs the transmitting the another access management instruction to the shared computing system application by transmitting the access management instruction as an outgoing message 260 from the identity management module 220 to the multi-customer gateway. In the identity management module is located external to a firewall of a customer, and the on-premise proxy and the customer internal application are located internal to the firewall. The shared computing system application and the multi-customer gateway on the shared computing system are located external to the customer firewall.

In some embodiments, recommendation engine 240 monitors the shared computing system and the customer internal application via incoming messages 210 for fulfillment of the access management instruction and the another access management instruction. In some embodiments, recommendation engine 240 monitors the shared computing system and the customer internal application for fulfillment of the access management instruction and the another access management instruction, diagnoses a present problem based at least in part on a failure of fulfillment of the access management instruction or the another access management instruction, and suggests a correction to the problem.

In some embodiments, recommendation engine 240 monitors the shared computing system and the customer internal application via incoming messages 210 for fulfillment of the access management instruction and the another access management instruction as well as patterns of access management instructions and fulfillments, diagnoses a present problem based at least in part on a pattern of failures of access management instruction and fulfillments, and suggests a correction to the problem.

In some embodiments, recommendation engine 240 monitors the shared computing system and the customer internal application via incoming messages 210 for fulfillment of the access management instruction and the another access management instruction as well as patterns of access management instructions and fulfillments, predicts a future problem based at least in part on a pattern of failures of access management instruction and fulfillments, and suggests a correction to the problem. In some embodiments, diagnosing, predicting or suggesting by recommendation engine 240 include diagnosing, predicting or suggesting based at least in part on a neural networks learning based prediction engine accessing runtime-data to make predictions based on changes in usage patterns.

Figure 3:
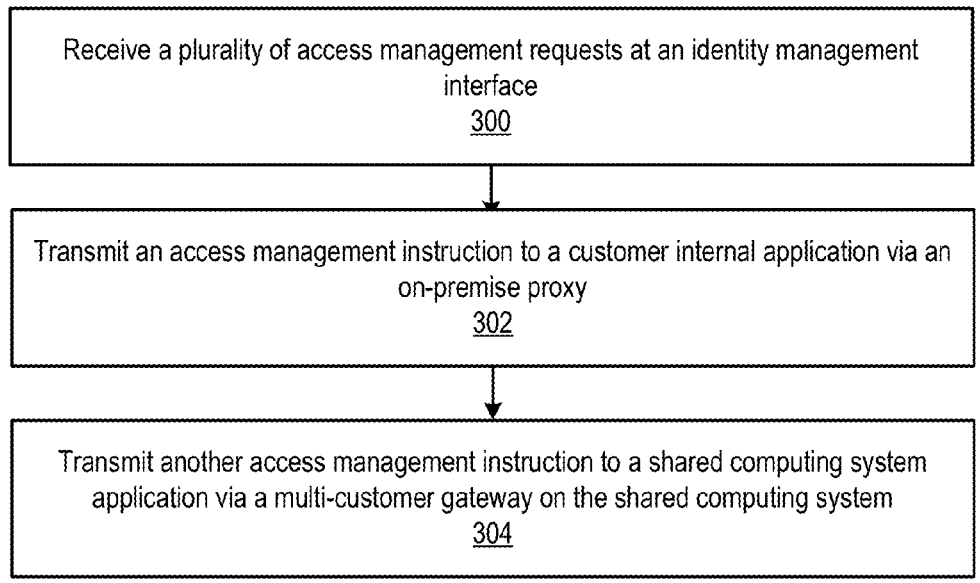
FIG. 3 is a flowchart of operations used in performing identity management with a unified management interface across internal and shared computing applications, according to some embodiments.

FIG. 3 is a flowchart of operations used in performing identity management with a unified management interface across internal and shared computing applications, according to some embodiments. A plurality of access management requests is received at an identity management interface (block 300). An access management instruction is transmitted to a customer internal application via an on-premise proxy (block 302). In some embodiments, the access management instruction performs an access management operation indicated in a request of the plurality. Another access management instruction is transmitted to a shared computing system application via a multi-customer gateway on the shared computing system (block 304). In some embodiments, the another access management instruction performs another access management operation indicated in another request of the plurality.

Figure 4:
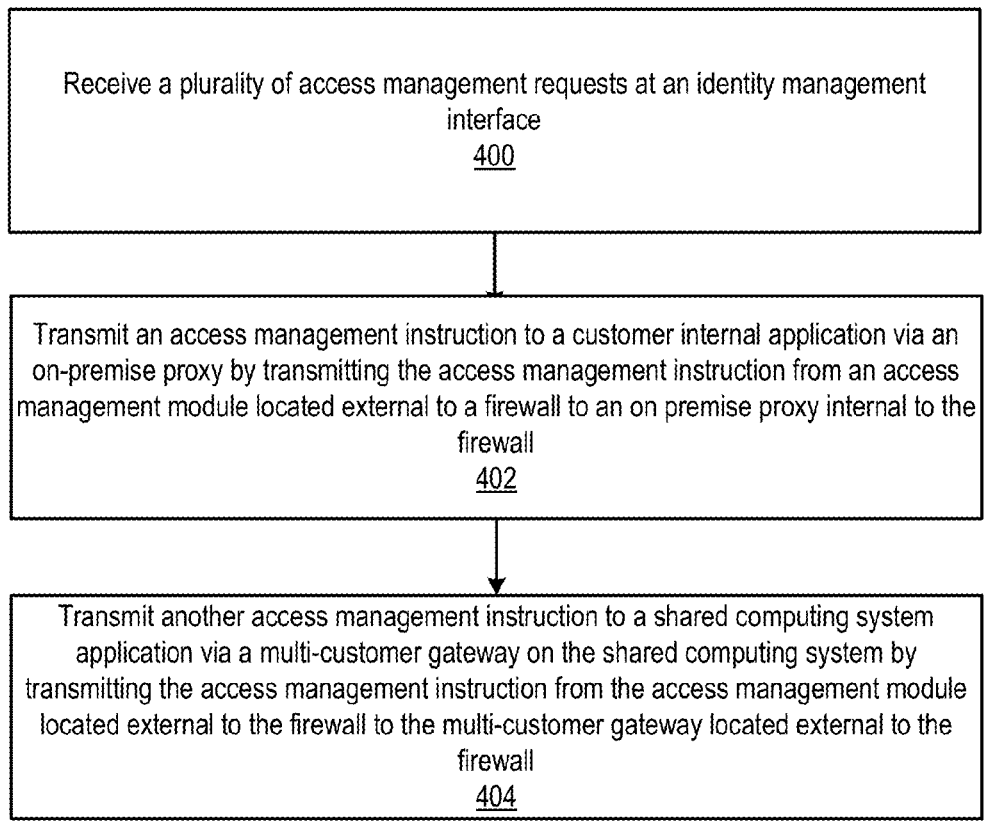
FIG. 4 is a flowchart of operations used in performing identity management with a unified management interface across internal and shared computing applications, according to some embodiments.

FIG. 4 is a flowchart of operations used in performing identity management with a unified management interface across internal and shared computing applications, according to some embodiments. A plurality of access management requests is received at an identity management interface (block 400). An access management instruction is transmitted to a customer internal application via an on-premise proxy by transmitting the access management instruction from an access management module located external to a firewall to an on premise proxy internal to the firewall (block 402). Another access management instruction is transmitted to a shared computing system application via a multi-customer gateway on the shared computing system by transmitting the access management instruction from the access management module located external to the firewall to the multi-customer gateway located external to the firewall (block 404).

Figure 5:
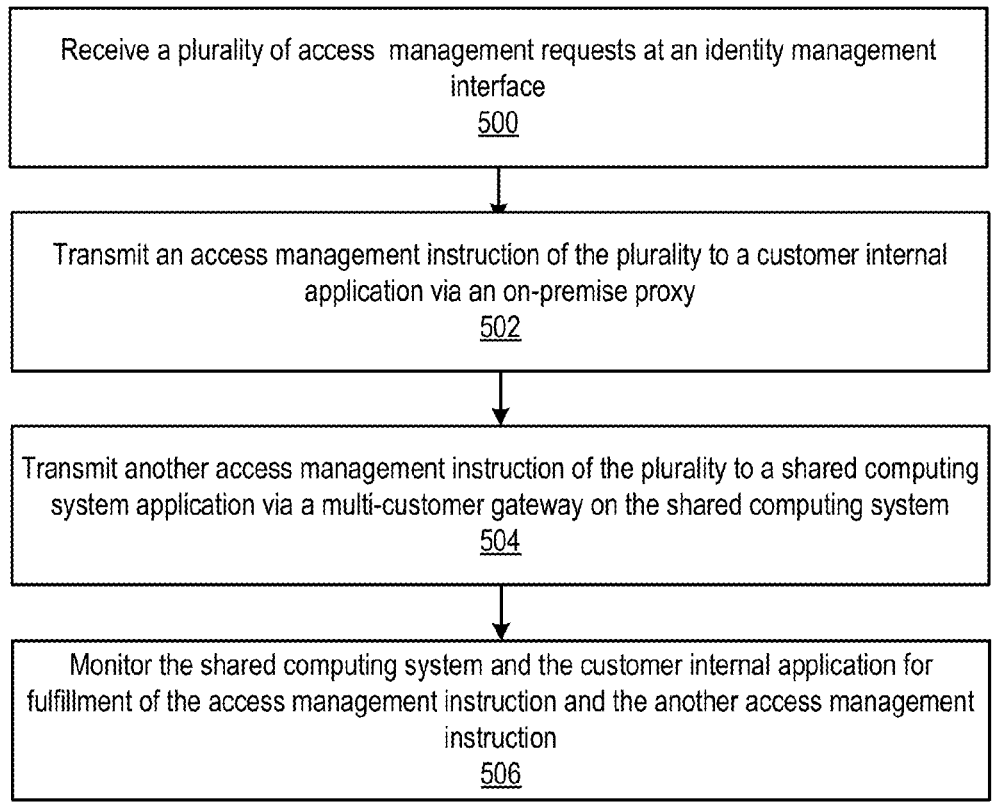
FIG. 5 is a flowchart of operations used in performing monitoring functions in identity management with a unified management interface across internal and shared computing applications, according to some embodiments.

FIG. 5 is a flowchart of operations used in performing monitoring functions in identity management with a unified management interface across internal and shared computing applications, according to some embodiments. A plurality of access management requests is received at an identity management interface (block 500). An access management instruction of the plurality is transmitted to a customer internal application via an on-premise proxy (block 502). Another access management instruction of the plurality is transmitted to a shared computing system application via a multi-customer gateway on the shared computing system (block 504). The shared computing system and the customer internal application are monitored for fulfillment of the access management instruction and the another access management instruction (block 506).

Figure 6:
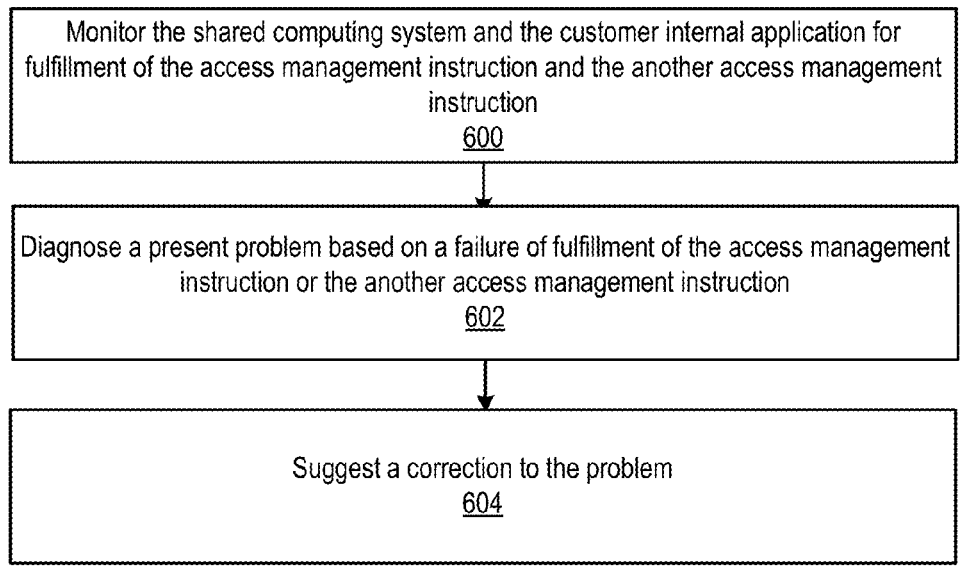
FIG. 6 is a flowchart of operations used in performing diagnostic functions in identity management with a unified management interface across internal and shared computing applications, according to some embodiments.

FIG. 6 is a flowchart of operations used in performing diagnostic functions in identity management with a unified management interface across internal and shared computing applications, according to some embodiments. The shared computing system and the customer internal application are monitored for fulfillment of the access management instruction and the another access management instruction (block 600). A present problem is diagnosed based on a failure of fulfillment of the access management instruction or the another access management instruction (block 602). A correction to the problem is suggested (block 604).

Figure 7:
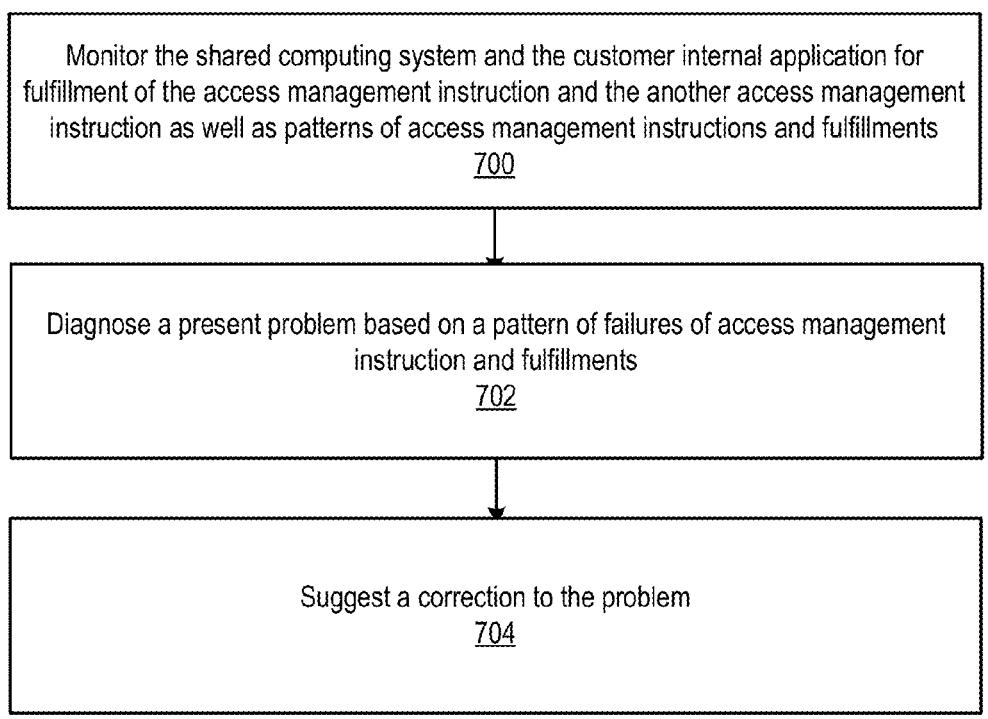
FIG. 7 is a flowchart of operations used in performing diagnostic functions in identity management with a unified management interface across internal and shared computing applications, according to some embodiments.

FIG. 7 is a flowchart of operations used in performing diagnostic functions in identity management with a unified management interface across internal and shared computing applications, according to some embodiments. The shared computing system and the customer internal application are monitored for fulfillment of the access management instruction and the another access management instruction as well as patterns of access management instructions and fulfillments (block 700). A present problem is diagnosed based on a pattern of failures of access management instruction and fulfillments (block 702). A correction to the problem is suggested (block 704).

Figure 8:
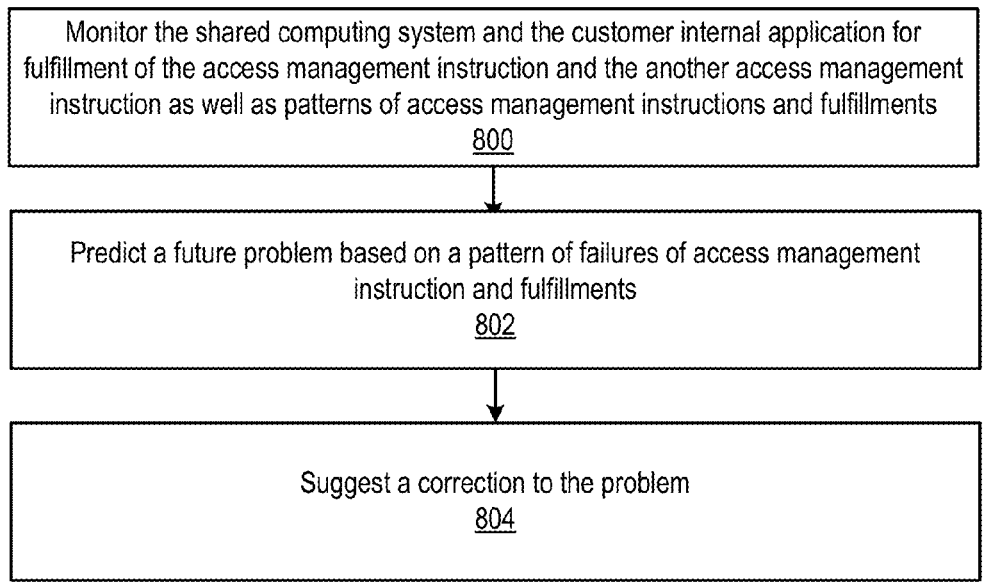
FIG. 8 is a flowchart of operations used in performing predictive diagnostic functions in identity management with a unified management interface across internal and shared computing applications, according to some embodiments.

FIG. 8 is a flowchart of operations used in performing predictive diagnostic functions in identity management with a unified management interface across internal and shared computing applications, according to some embodiments. The shared computing system and the customer internal application are monitored for fulfillment of the access management instruction and the another access management instruction as well as patterns of access management instructions and fulfillments (block 800). A future problem based on a pattern of failures of access management instruction and fulfillments (block 802). A correction to the problem is suggested (block 804).

Figure 9:
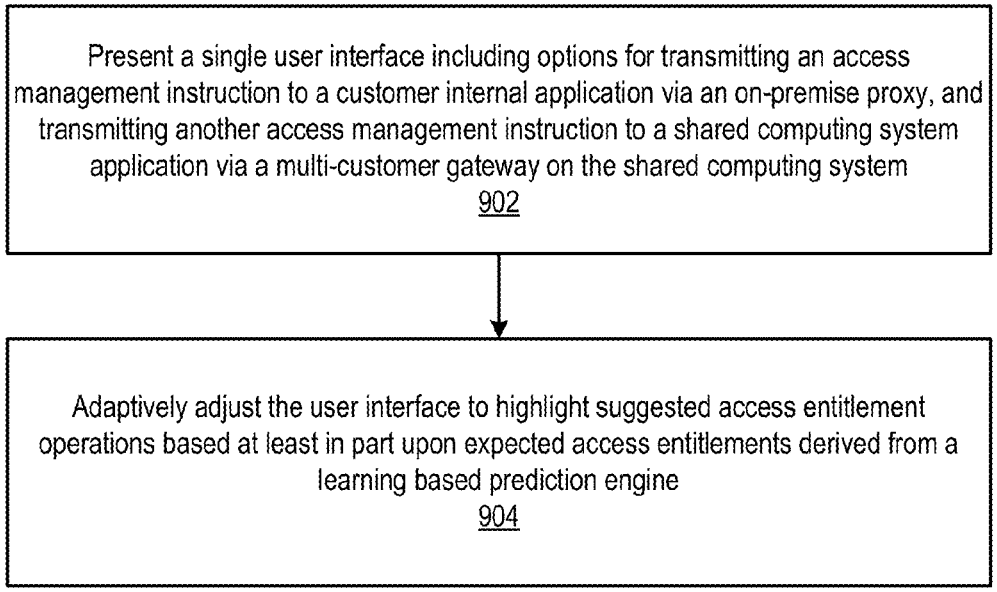
FIG. 9 is a flowchart of operations used in performing predictive functions in identity management with a unified management interface across internal and shared computing applications, according to some embodiments.

FIG. 9 is a flowchart of operations used in performing predictive functions in identity management with a unified management interface across internal and shared computing applications, according to some embodiments. A single user interface including options for transmitting an access management instruction to a customer internal application via an on-premise proxy, and transmitting another access management instruction to a shared computing system application via a multi-customer gateway on the shared computing system is presented (block 900). The user interface is adaptively adjusted to highlight suggested access entitlement operations based at least in part upon expected access entitlements derived from a learning based prediction engine (block 902).

Figure 10:
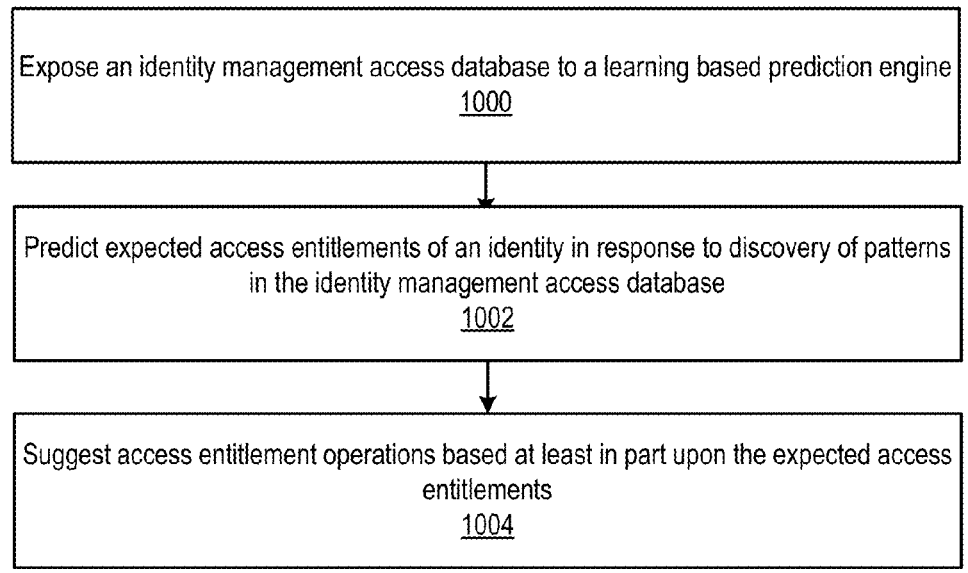
FIG. 10 is a flowchart of operations used in performing adaptive user interface functions in identity management with a unified management interface across internal and shared computing applications, according to some embodiments.

FIG. 10 is a flowchart of operations used in performing adaptive user interface functions in identity management with a unified management interface across internal and shared computing applications, according to some embodiments. An identity management access database is exposed to a learning based prediction engine (block 1000). Expected access entitlements of an identity are predicted in response to discovery of patterns in the identity management access database (block 1002). Access entitlement operations are suggested based at least in part upon the expected access entitlements (block 1004).

Figure 11:
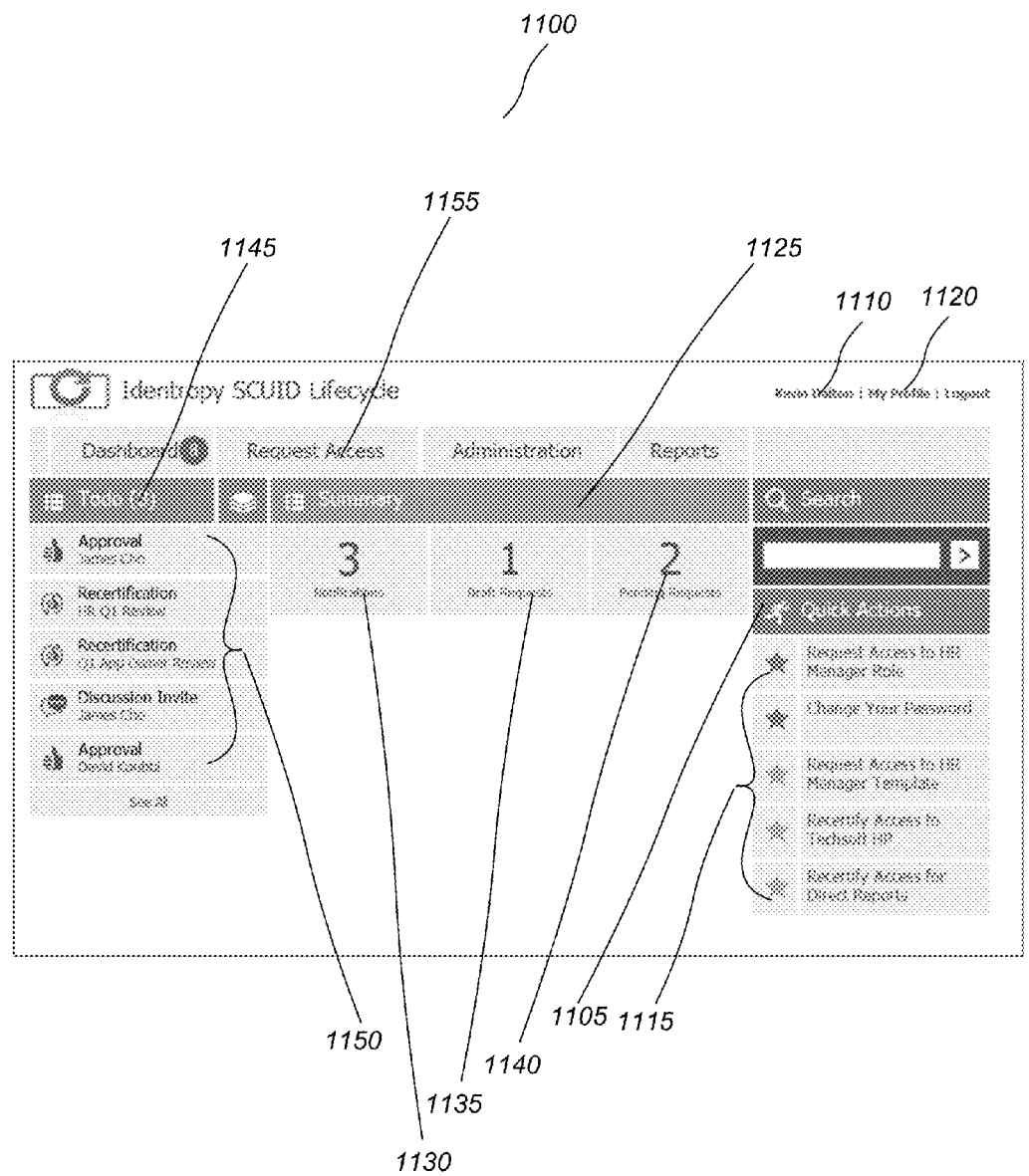
FIG. 11 is a graphical user interface for performing adaptive user interface functions in identity management with a unified management interface across internal and shared computing applications, according to some embodiments.

FIG. 11 is a graphical user interface for performing adaptive user interface functions in identity management with a unified management interface across internal and shared computing applications, according to some embodiments. User interface 1100 is a dashboard interface. Upon presentation, user interface 1100 presents a quick actions toolbar 1105, which immediately informs the user listed in a user identity segment 1110 of suggested (quick) actions 1115, which are suggested based upon recommendations from a recommendation engine. This is based on the end user's identity data, as reported in a profile that can be accessed through a profile control 1120 and past behavior (most frequently used actions). Examples of profile data can include a user's name, title and department, direct reports, with links to access their profiles. A summary notification presents notification of events requiring user action, such notifications 1130, draft requests 1135, and pending requests 1140. A todo list 1145 is presented, showing various items 1150 requiring user attention. User interface 1100 also includes a control for accessing an access request interface 1155, which triggers display of the screen shown in FIG. 12.

Figure 12:
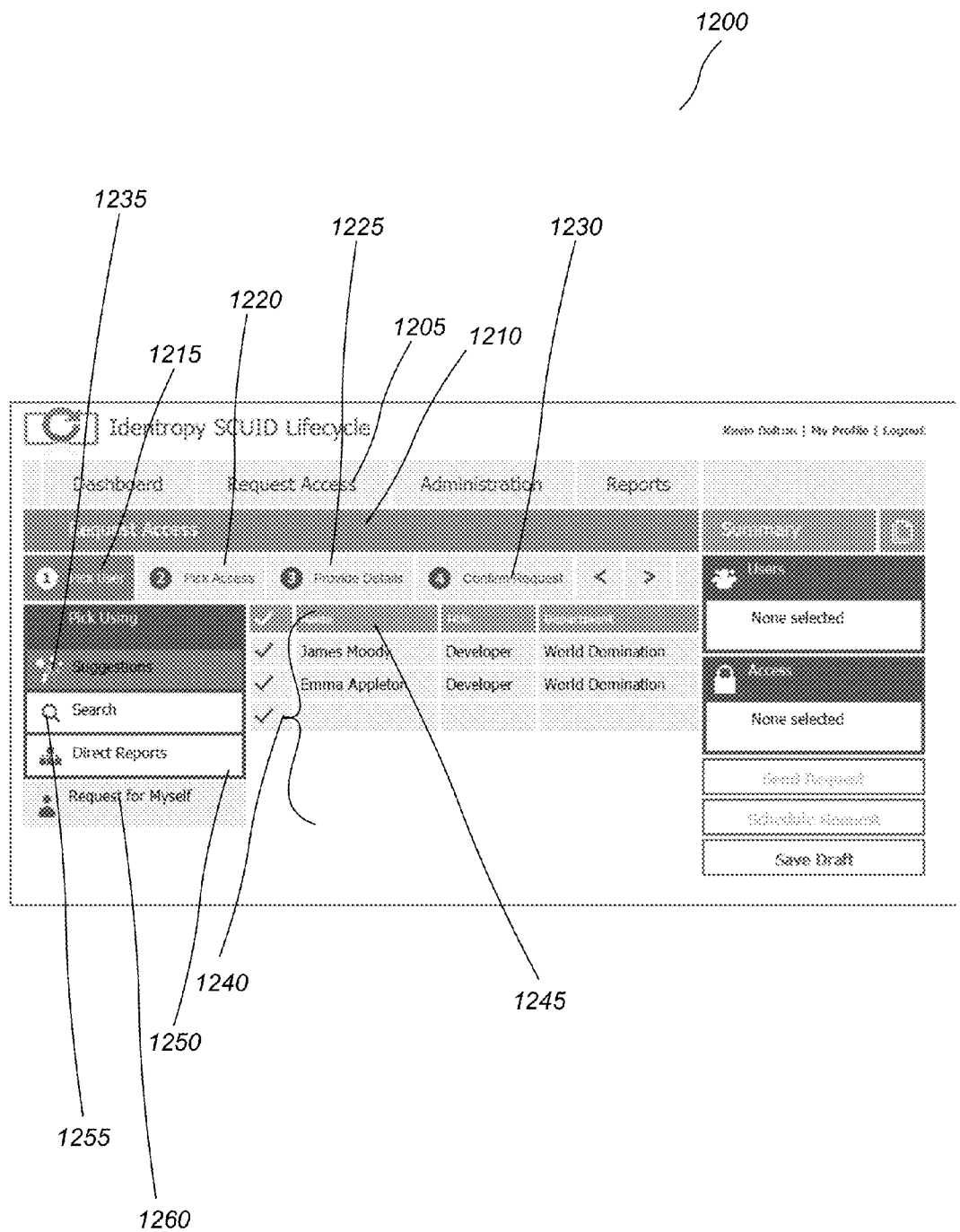
FIG. 12 is a graphical user interface for performing adaptive user interface functions in identity management with a unified management interface across internal and shared computing applications, according to some embodiments.

FIG. 12 is a graphical user interface for performing adaptive user interface functions in identity management with a unified management interface across internal and shared computing applications, according to some embodiments. Upon presentation in response to actuation of a control for accessing an access request interface 1205, user interface 1200 presents an access request interface 1210 for processing through a control for selecting a user 1215, a control for selecting access 1220, a control for providing details 1225, and a control for confirming an access request 1230. When the user actuates the suggestions control 1235 in the access request interface 1210, the recommendation engine determines, based on the end user's identity data, as well as behavioral patterns over the last interactions, who are the most likely users for which the end user (the requester) may want to request access. The most likely users 1240 are presented in a user list 1245. A user is also able to request a list of direct reports through a direct reports control 1250, to search for a particular user with a search control 1255, or to request access for the user through a request for myself control 1260.

Figure 13:
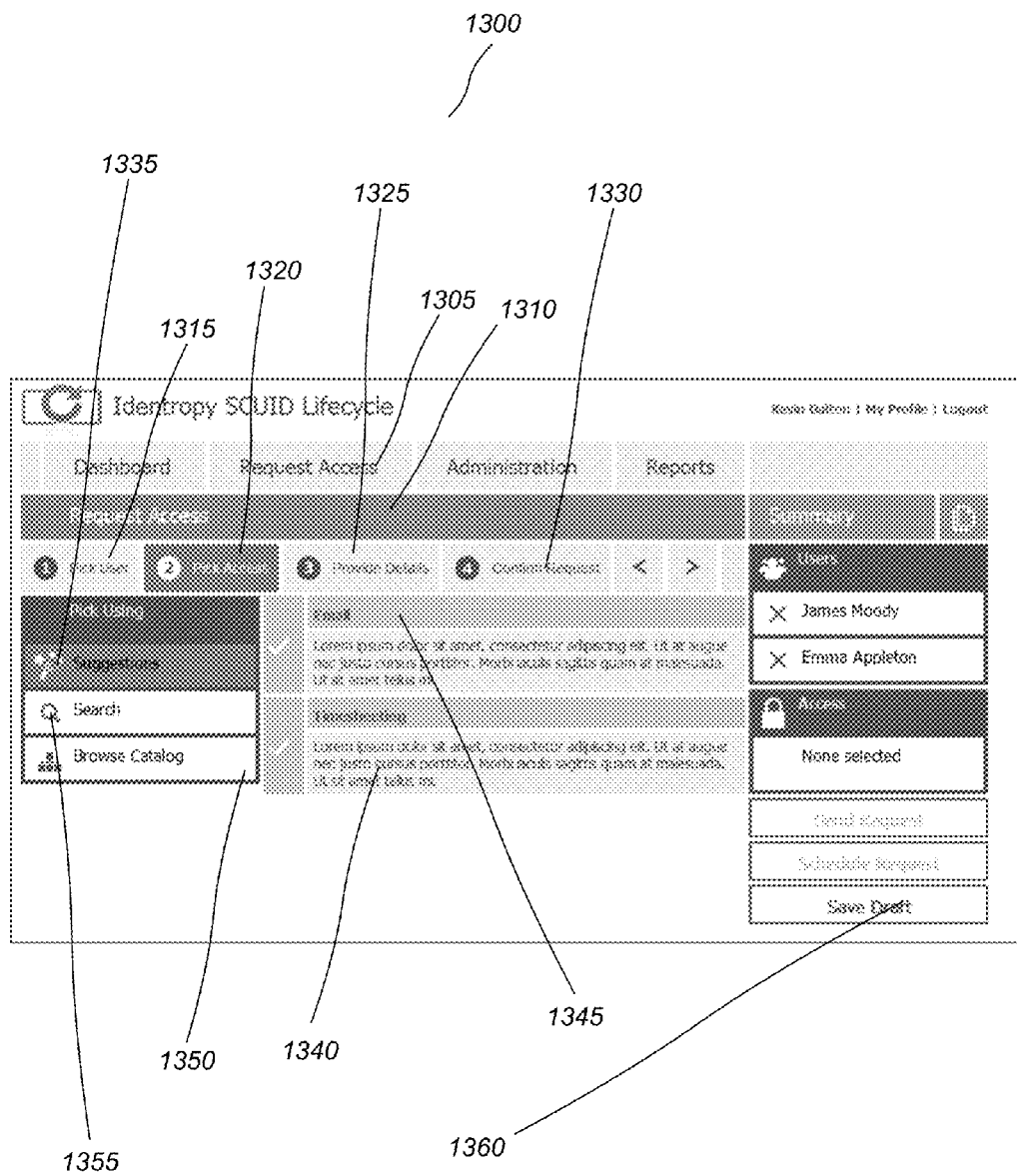
FIG. 13 is a graphical user interface for performing adaptive user interface functions in identity management with a unified management interface across internal and shared computing applications, according to some embodiments.
Figure 14:
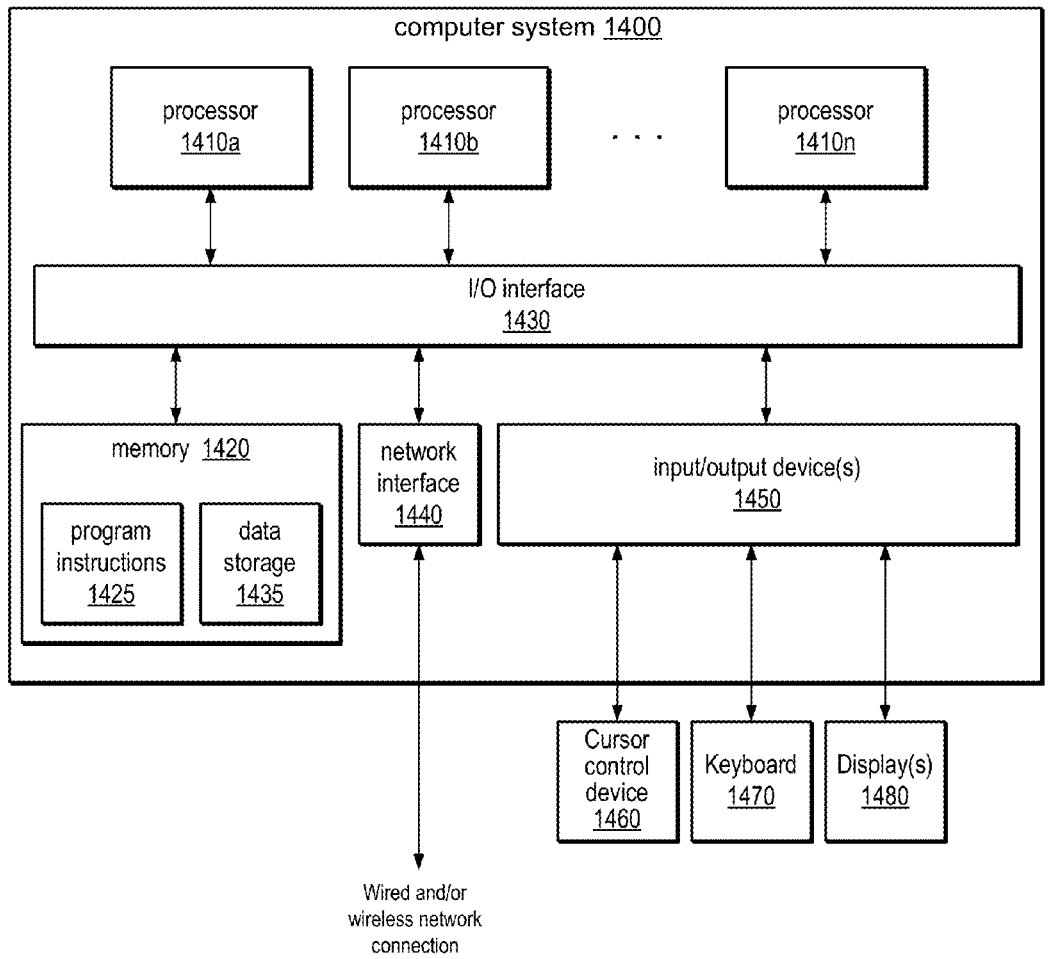
FIG. 14 illustrates an example computer system that may be used in embodiments.

FIG. 13 is a graphical user interface for performing adaptive user interface functions in identity management with a unified management interface across internal and shared computing applications, according to some embodiments. Upon presentation in response to actuation of a control for accessing an access request interface 1305, user interface 1300 presents an access request interface 1310 for processing through a control for selecting a user 1315, a control for selecting access 1320, a control for providing details 1325, and a control for confirming an access request 1330. After selecting two users on behalf which to make the request, the requester clicks on suggestions 1335, and the recommendation engine determines the most likely entitlements that the requester would want to request based on requester's identity data, target users (requestees) identity data and behavioral patterns (i.e. based on last requests). In this case timesheeting 1340 and email 1345 are suggested. A catalog of entitlements may be browsed using a browse catalog control 1350, or a search may be performed using a search control 1355. After a completion of entry details, a draft may be saved using a save draft control 1360.

Responsive to receiving a plurality of access management requests 1340 and 1345 at an identity management interface (user interface 1300), an identity management module will transmit an access management instruction to a customer internal application via an on-premise proxy and transmit another access management instruction to a shared computing system application via a multi-customer gateway on the shared computing system, as described herein.

Example System

Embodiments of a identity management module and/or of the various identity management techniques as described herein may be executed on one or more computer systems, which may interact with various other devices. One such computer system is illustrated by FIG. 14. In different embodiments, computer system 1400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some embodiments, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions and/or data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a identity management module are shown stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1000 and may interact with one or more nodes of computer system 1000 through a wired or wireless connection, such as over network interface 1040.

As shown in FIG. 14, memory 1420 may include program instructions 1425, configured to implement embodiments of an identity management module as described herein, and data storage 1435, comprising various data accessible by program instructions 1425. In one embodiment, program instructions 1425 may include software elements of embodiments of an identity management module as illustrated in the above Figures. Data storage 1435 may include data that may be used in embodiments. In other embodiments, other or different software elements and data may be included.

Those skilled in the art will appreciate that computer system 1400 is merely illustrative and is not intended to limit the scope of an identity management module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, comprising:
using one or more processors to perform, responsive to receiving a plurality of access management requests at an identity management interface of an identity management module,
transmitting an access management instruction to a customer internal application via an on-premise proxy; and transmitting another access management instruction to a shared computing system application via a multi-customer gateway on the shared computing system, wherein the on-premise proxy and the customer internal application are located internal to a firewall, the shared computing system application and the multi-customer gateway on the shared computing system are located external to the firewall, the identity management module is located external to the firewall, and the identity management module comprises one or more tools for allowing a user to create and manage accounts on each of the shared computing system application and the customer internal application.

2. The method of claim 1, wherein the transmitting the access management instruction to a customer internal application further comprises transmitting the access management instruction from an identity management module to the on premise proxy;

the transmitting the another access management instruction to the shared computing system application further comprises transmitting the access management instruction from the identity management module to the multi-customer gateway.

3. The method of claim 1, further comprising, monitoring the shared computing system and the customer internal application for fulfillment of the access management instruction and the another access management instruction.

4. The method of claim 1, further comprising, monitoring the shared computing system and the customer internal application for fulfillment of the access management instruction and the another access management instruction;

diagnosing a present problem based at least in part on a failure of fulfillment of the access management instruction or the another access management instruction; and suggesting a correction to the problem.

5. The method of claim 1, further comprising, monitoring the shared computing system and the customer internal application for fulfillment of the access management instruction and the another access management instruction as well as patterns of access management instructions and fulfillments;

diagnosing a present problem based at least in part on a pattern of failures of access management instruction and fulfillments; and suggesting a correction to the problem.

6. The method of claim 1, further comprising, monitoring the shared computing system and the customer internal application for fulfillment of the access management instruction and the another access management instruction as well as patterns of access management instructions and fulfillments;

predicting a future problem based at least in part on a pattern of failures of access management instruction and fulfillments; and suggesting a correction to the problem.

7. The method of claim 6, wherein the predicting further comprises predicting based at least in part on a neural networks learning based prediction engine accessing runtime-data to make predictions based on changes in usage patterns.

8. A system, comprising:

at least one processor; and a memory comprising program instructions, wherein the program instructions are executable by the at least one processor to:

responsive to receiving a plurality of access management requests at an identity management interface of an identity management module, transmit an access management instruction to a customer internal application via an on-premise proxy; and transmit another access management instruction to a shared computing system application via a multi-customer gateway on the shared computing system, wherein the on-premise proxy and the customer internal application are located internal to a firewall, the shared computing system application and the multi-customer gateway on the shared computing system are located external to the firewall, the identity management module is located external to the firewall, and the identity management module comprises program instructions executable by the at least one processor to allow a user to create and manage accounts on each of the shared computing system application and the customer internal application.

9. The system of claim 8, wherein the program instructions executable by the at least one processor to transmit the access management instruction to a customer internal application further comprise program instructions executable by the at least one processor to transmitting the access management instruction from an identity management module to the on premise proxy;

the program instructions executable by the at least one processor to transmit the another access management instruction to the shared computing system application further comprise program instructions executable by the at least one processor to transmit the access management instruction from the identity management module to the multi-customer gateway.

10. The system of claim 8, further comprising, program instructions executable by the at least one processor to monitor the shared computing system and the customer internal application for fulfillment of the access management instruction and the another access management instruction.

11. The system of claim 8, further comprising, program instructions executable by the at least one processor to monitor the shared computing system and the customer internal application for fulfillment of the access management instruction and the another access management instruction;

program instructions executable by the at least one processor to diagnose a present problem based at least in part on a failure of fulfillment of the access management instruction or the another access management instruction; and program instructions executable by the at least one processor to suggest a correction to the problem.

12. The system of claim 8, further comprising, program instructions executable by the at least one processor to monitor the shared computing system and the customer internal application for fulfillment of the access management instruction and the another access management instruction as well as patterns of access management instructions and fulfillments;

program instructions executable by the at least one processor to diagnose a present problem based at least in part on a pattern of failures of access management instruction and fulfillments; and program instructions executable by the at least one processor to suggest a correction to the problem.

13. The system of claim 12, wherein the program instructions executable by the at least one processor to diagnose further comprise program instructions executable by the at least one processor to diagnose based at least in part on a neural networks learning based prediction engine accessing runtime-data to make predictions based on changes in usage patterns.

14. The system of claim 8, further comprising,
monitoring the shared computing system and the customer internal application for fulfillment of the access management instruction and the another access management instruction as well as patterns of access management instructions and fulfillments;
predicting a future problem based at least in part on a pattern of failures of access management instruction and fulfillments; and
suggesting a correction to the problem.

15. A non-transitory computer-readable storage medium storing program instructions, wherein the program instructions are computer-executable to implement:
responsive to receiving a plurality of access management requests at an identity management interface
transmitting an access management instruction to a customer internal application via an on-premise proxy; and
transmitting another access management instruction to a shared computing system application via a multi-customer gateway on the shared computing system, wherein
the on-premise proxy and the customer internal application are located internal to a firewall,
the shared computing system application and the multi-customer gateway on the shared computing system are located external to the firewall,
the identity management module is located external to the firewall, and
the identity management module comprises program instructions computer-executable to implement allowing a user to create and manage accounts on each of the shared computing system application and the customer internal application.

16. The non-transitory computer-readable storage medium of claim 15, wherein
the program instructions computer-executable to implement transmitting the access management instruction to a customer internal application further comprise program instructions computer-executable to implement transmitting the access management instruction from an identity management module to the on premise proxy;
the program instructions computer-executable to implement transmitting the another access management instruction to the shared computing system application further comprise program instructions computer-executable to implement transmitting the access management instruction from the identity management module to the multi-customer gateway.

17. The non-transitory computer-readable storage medium of claim 15, further comprising, program instructions computer-executable to implement monitoring the shared computing system and the customer internal application for fulfillment of the access management instruction and the another access management instruction.

18. The non-transitory computer-readable storage medium of claim 15, further comprising,
program instructions computer-executable to implement monitoring the shared computing system and the customer internal application for fulfillment of the access management instruction and the another access management instruction;
program instructions computer-executable to implement diagnosing a present problem based at least in part on a failure of fulfillment of the access management instruction or the another access management instruction; and
program instructions computer-executable to implement suggesting a correction to the problem.

19. The non-transitory computer-readable storage medium of claim 15, further comprising,
program instructions computer-executable to implement monitoring the shared computing system and the customer internal application for fulfillment of the access management instruction and the another access management instruction as well as patterns of access management instructions and fulfillments;
program instructions computer-executable to implement diagnosing a present problem based at least in part on a pattern of failures of access management instruction and fulfillments; and
program instructions computer-executable to implement suggesting a correction to the problem.

20. The non-transitory computer-readable storage medium of claim 15, wherein the program instructions computer-executable to implement suggesting further comprise program instructions computer-executable to implement suggesting based at least in part on a neural networks learning based prediction engine accessing runtime-data to make predictions based on changes in usage patterns.

21. The non-transitory computer-readable storage medium of claim 15, further comprising,
program instructions computer-executable to implement monitoring the shared computing system and the customer internal application for fulfillment of the access management instruction and the another access management instruction as well as patterns of access management instructions and fulfillments;
program instructions computer-executable to implement predicting a future problem based at least in part on a pattern of failures of access management instruction and fulfillments; and
program instructions computer-executable to implement suggesting a correction to the problem.

\* \* \* \* \*